(12) United States Patent
Nagura

(10) Patent No.: US 8,171,974 B2
(45) Date of Patent: May 8, 2012

(54) FILM LAMINATING APPARATUS

(75) Inventor: Takayuki Nagura, Kakegawa (JP)

(73) Assignee: Corning Incorporated, Corning, NY (US)

( * ) Notice: Subject to any disclaimer, the term of this patent is extended or adjusted under 35 U.S.C. 154(b) by 796 days.

(21) Appl. No.: 11/919,142

(22) PCT Filed: Apr. 27, 2006

(86) PCT No.: PCT/JP2006/308896
§ 371 (c)(1),
(2), (4) Date: Oct. 23, 2007

(87) PCT Pub. No.: WO2006/118216
PCT Pub. Date: Nov. 9, 2006

(65) Prior Publication Data
US 2009/0301659 A1 Dec. 10, 2009

(30) Foreign Application Priority Data
Apr. 27, 2005 (JP) .................. 2005-129919

(51) Int. Cl.
B32B 37/02 (2006.01)

(52) U.S. Cl. ...................................................... 156/516
(58) Field of Classification Search .................. 156/516
See application file for complete search history.

(56) References Cited

U.S. PATENT DOCUMENTS 5,738,744 A * 4/1998 Washizaki et al. ............ 156/159
6,929,708 B1 * 8/2005 Wyman et al. ................ 156/159

FOREIGN PATENT DOCUMENTS

EP 1249340 A1 * 10/2002
JP 2002036359 A * 2/2002

* cited by examiner

Primary Examiner — Philip Tucker
Assistant Examiner — Vicki Wu
(74) Attorney, Agent, or Firm — Siwen Chen

(57) ABSTRACT

A conveyor conveys glass sheets horizontally, while holding them in an upright orientation. Film feed units are provided on both sides of a conveyance path of the glass sheets. Nip rollers press against both surfaces of the glass sheets via films fed from the film feed units so as to sandwich the glass sheets, while the glass sheets are being conveyed by the conveyor.

16 Claims, 8 Drawing Sheets

FILM LAMINATING APPARATUS

TECHNICAL FIELD

The present invention relates to a film laminating apparatus. Particularly, the present invention relates to a film laminating apparatus for simultaneously laminating protective films on both surfaces of comparatively large-area glass sheets, which are manufactured as LCD glass substrates or the like in factories, prior to being cut into smaller plates according to the specific uses thereof.

BACKGROUND ART

In factories that manufacture glass sheets which are used, for example, as LCD glass substrates, protective films are laminated on both surfaces of a manufactured glass sheet at the final stations of transportation conveyors for conveying the manufactured glass sheets. The purpose of the protective films is to protect the glass surface quality during subsequent glass handling processes.

Typically, when such a protective film is laminated on the surfaces of a glass sheet, a press roller is used to laminate thereon the protective film unwound from a film roll as described, for example, in Japanese Unexamined Patent Publication No. 2002-347118.

However, in the case that protective films are automatically and simultaneously laminated on both surfaces of glass sheets having comparatively large areas, large film laminating apparatuses are required. Further, it is difficult to introduce film laminating apparatuses directly that is, in line, in a downstream part of glass sheet manufacturing lines.

In addition, demand for improved productivity of glass, increases in the amount of glass supply, and reduction of cycle times of the glass production process is becoming great. Therefore, it is necessary to meet these demands.

DISCLOSURE OF THE INVENTION

Problems to be Solved by the Invention

In view of the foregoing circumstances, an object of the invention is to provide a film laminating apparatus which can be directly introduced in a glass sheet manufacturing line, can simultaneously laminate protective films on both surfaces of glass sheets continuously, can be made relatively compact, thereby reducing the space occupied thereby, and can be readily adapted to reductions in cycle times for the glass production process.

Means for Solving the Problems

A film laminating apparatus according to the present invention is characterized by comprising: a conveyor for horizontally conveying glass sheets while holding the glass sheets in an upright orientation; film feed units disposed on both sides of a conveyance path through which the glass sheets are conveyed by the conveyor; and vertical nip roller units, each of which comprises a plurality of nip rollers, wherein each nip roller has a vertically oriented rotational axis, and the nip rollers of the nip roller units are pressed, via the films respectively fed from the film feed units, against both surfaces of the glass sheets, which are being conveyed by the conveyor, so as to sandwich the glass sheets.

It is preferable for the plurality of nip rollers of the vertical nip roller unit to be selectively retractable from the surfaces of the glass sheets.

It is also preferable for each of the film feed units to be provided in an upright manner such that the rotational axis of a film feed roll having the film wound therearound, for feeding the film, and the rotational axes of a plurality of rollers, which are provided partway along a film feeding path from the film feed roll to the nip rollers, are oriented vertically.

It is also preferable for the nip rollers and the film feed roll of each film feed unit to be rotated in synchronization with each other.

It is also preferable for the film laminating apparatus of the invention to further comprise an automatic film roll replacement mechanism. In the automatic film roll replacement mechanism, the film feed roll is provided on a rotary table at a position apart from a vertical axis around which the rotary table turns, and a refill film roll is provided on the rotary table at a position symmetric with the film feed roll with respect to the vertical axis of the rotary table.

In this case, it is preferable for the film laminating apparatus of the invention to further comprise a film setting bar for holding the leading end of a refill film drawn from the refill film roll, wherein the film setting bar is provided so as to be movable between a standby position and a film joining position. When the film roll is to be replaced, the film setting bar is moved from the stand-by position to the film joining position and serves to join the leading end of a refill film to the film drawn from the film feed roll.

In addition, it is preferable for the film laminating apparatus of the invention to further comprise a cutter for cutting film drawn from the film feed roll, after the leading end of the refill film is joined to the film drawn from the film feed roll and the film setting bar is returned to its stand-by position.

It is also preferable for the rotary table to be turned to move the refill film roll to a film feeding position after the film drawn from the film feed roll is cut by the cutter.

Advantageous Effects of the Invention

The film laminating apparatus of the present invention comprises the vertical nip roller units, each of which comprises the plurality of nip rollers, wherein each nip roller has a vertically oriented rotational axis, and the nip rollers of the nip roller units are pressed, via the films respectively fed from the film feed units, against both surfaces of the glass sheets, which are being conveyed horizontally in an upright orientation by the conveyor. This configuration enables the film laminating apparatus to be directly introduced into the manufacturing line of the glass sheets such that it can continuously laminate films onto both surfaces of the glass sheets. This provides the advantage that the manufacturing plant can accommodate increases in glass production quantity per unit time without delay.

In addition, the nip roller unit itself can perform the film laminating operation with the position of the entirety thereof being fixed. The nip roller unit is provided in an upright manner such that the rotational axes of the respective nip rollers provided therein are vertically oriented. This provides the advantages that the construction of the nip roller unit can be simplified and made lighter, and the space occupied by the apparatus can be significantly reduced. In addition, the need to reduce cycle times for the glass production process with increases in the quantity of produced glass can be satisfied.

Further, rotating the nip rollers and the film feed roll in each nip roller unit in synchronization with each other precludes the possibility of a wrinkle or the like occurring in the film laminated on the surface of the glass sheets.

Still further, the film laminating apparatus of the invention has an automatic film roll replacement mechanism. This provides the advantages that replacement of the film rolls can be performed in a very short time, and that the need to reduce the cycle time of the glass production process can be satisfied without loss of glass.

BEST MODE FOR CARRYING OUT THE INVENTION

Hereinafter, the constitution and operation of a preferred embodiment of the invention will be described in detail with reference to the accompanying drawings.

Figure 1:
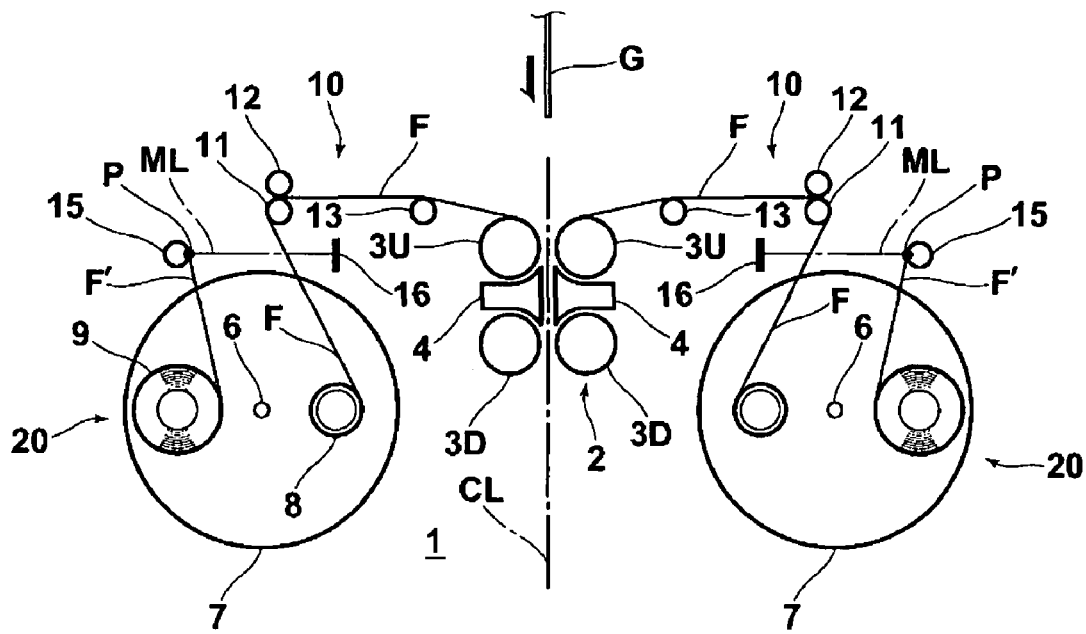
FIG. 1 is a plan view that schematically illustrates a film laminating apparatus according to an embodiment of the invention.
Figure 2A:
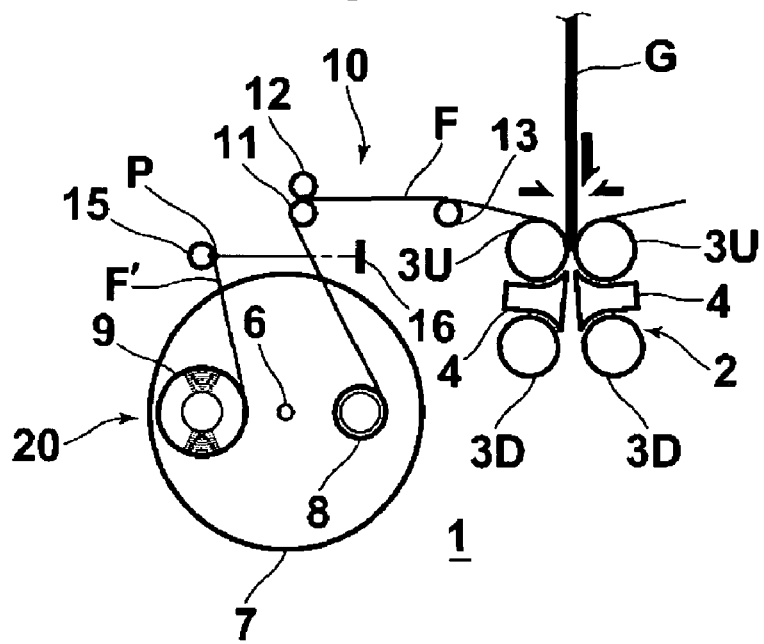
FIG. 2A is a plan view provided for explaining a film lamination operation by the film laminating apparatus of FIG. 1.
Figure 2B:
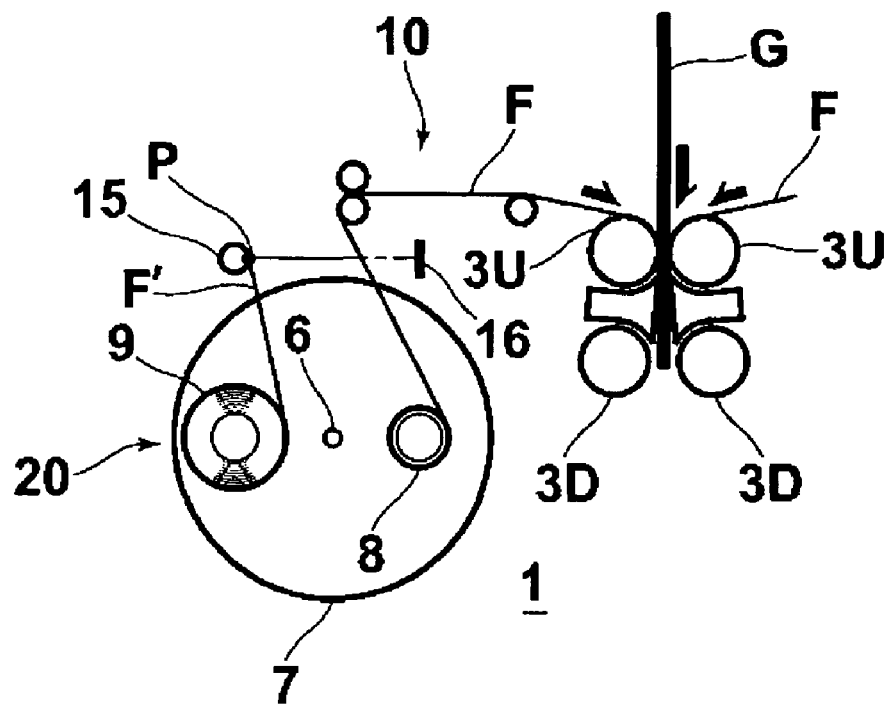
FIG. 2B is a plan view provided for explaining the film lamination operation by the film laminating apparatus of FIG. 1.
Figure 2C:
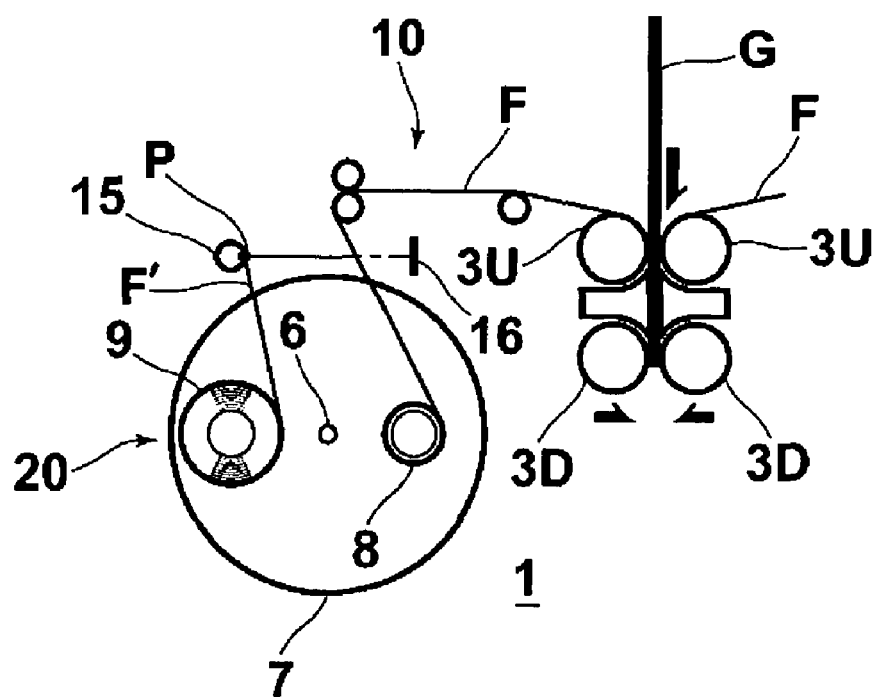
FIG. 2C is a plan view provided for explaining the film lamination operation by the film laminating apparatus of FIG. 1.
Figure 2D:
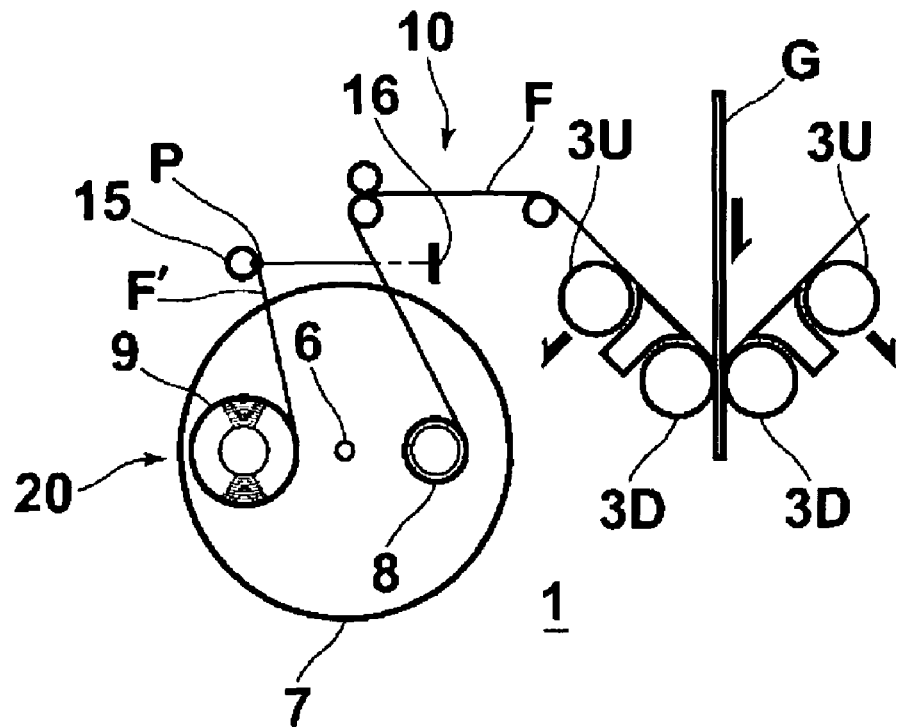
FIG. 2D is a plan view provided for explaining the film lamination operation by the film laminating apparatus of FIG. 1.
Figure 2E:
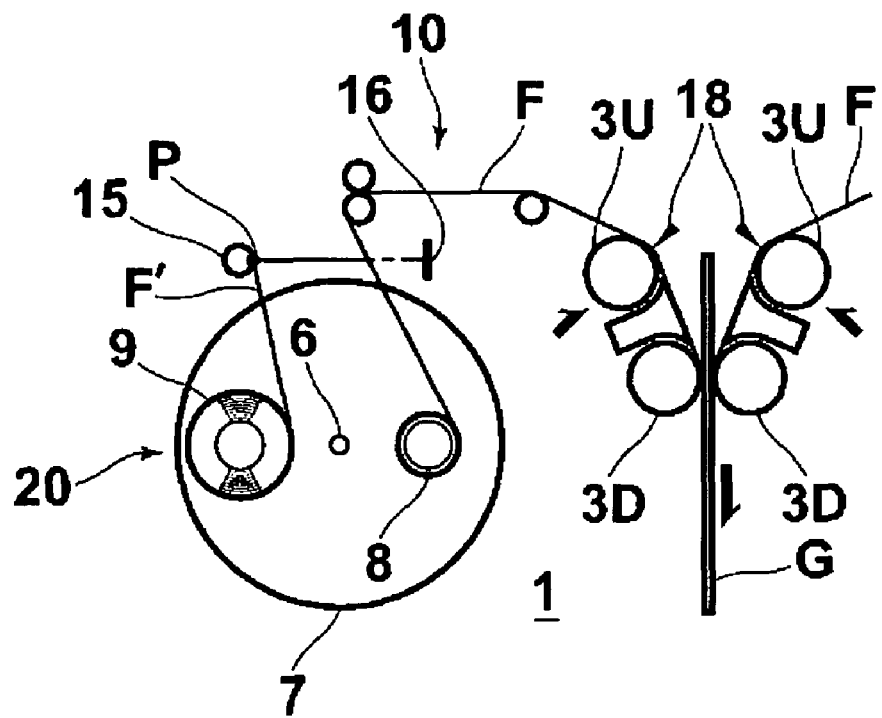
FIG. 2E is a plan view provided for explaining the film lamination operation by the film laminating apparatus of FIG. 1.
Figure 2F:
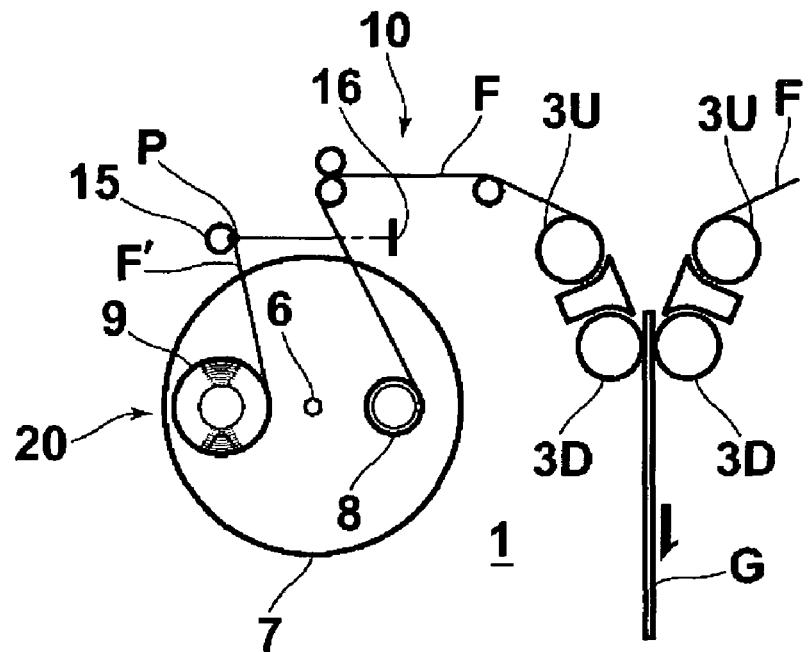
FIG. 2F is a plan view provided for explaining the film lamination operation by the film laminating apparatus of FIG. 1.
Figure 3A:
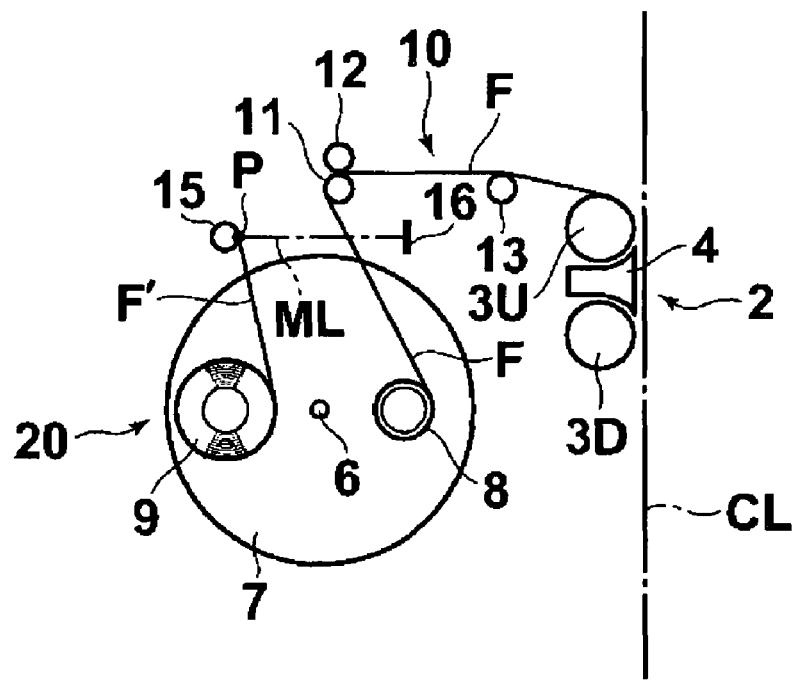
FIG. 3A is a plan view provided for explaining a film roll replacement operation by the film laminating apparatus of FIG. 1.
Figure 3B:
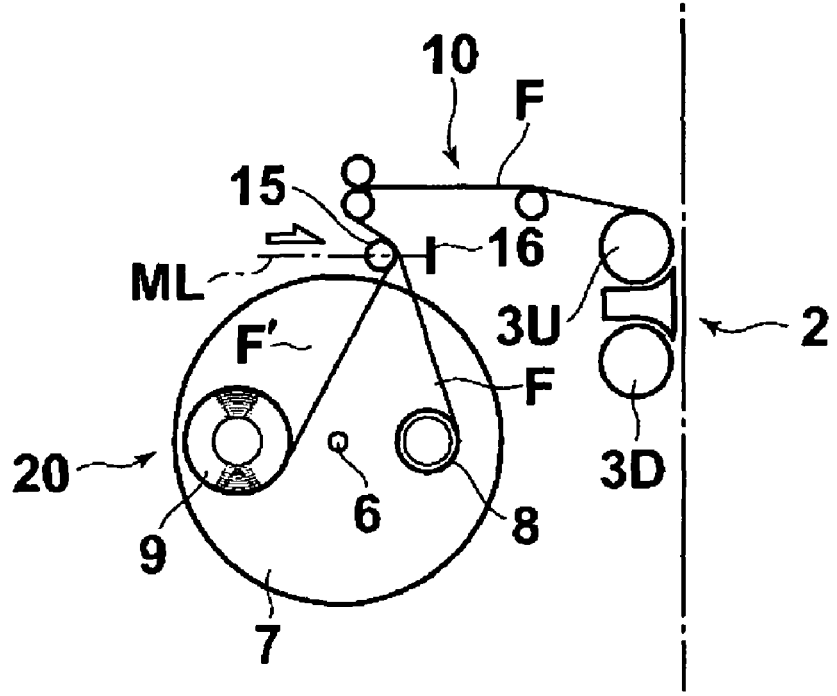
FIG. 3B is a plan view provided for explaining the film roll replacement operation by the film laminating apparatus of FIG. 1.
Figure 3C:
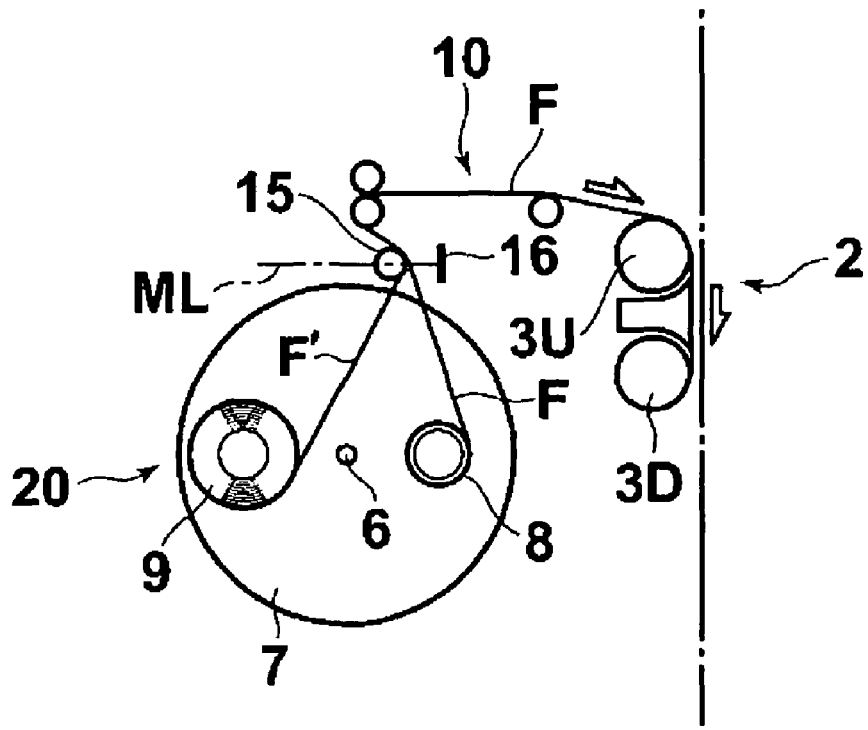
FIG. 3C is a plan view provided for explaining the film roll replacement operation by the film laminating apparatus of FIG. 1.
Figure 3D:
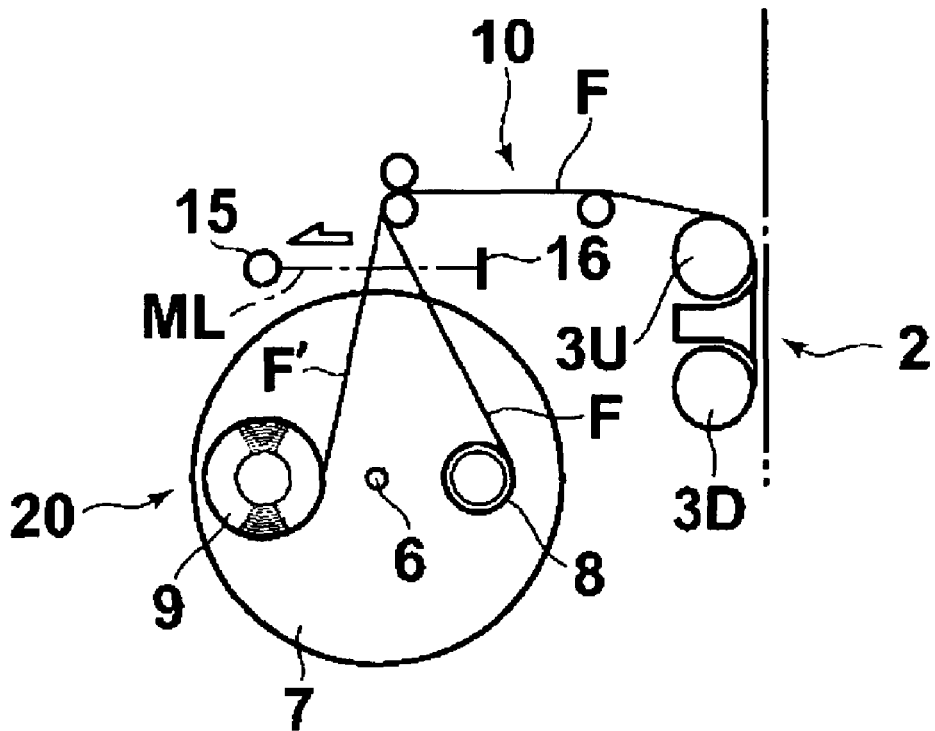
FIG. 3D is a plan view provided for explaining the film roll replacement operation by the film laminating apparatus of FIG. 1.
Figure 3E:
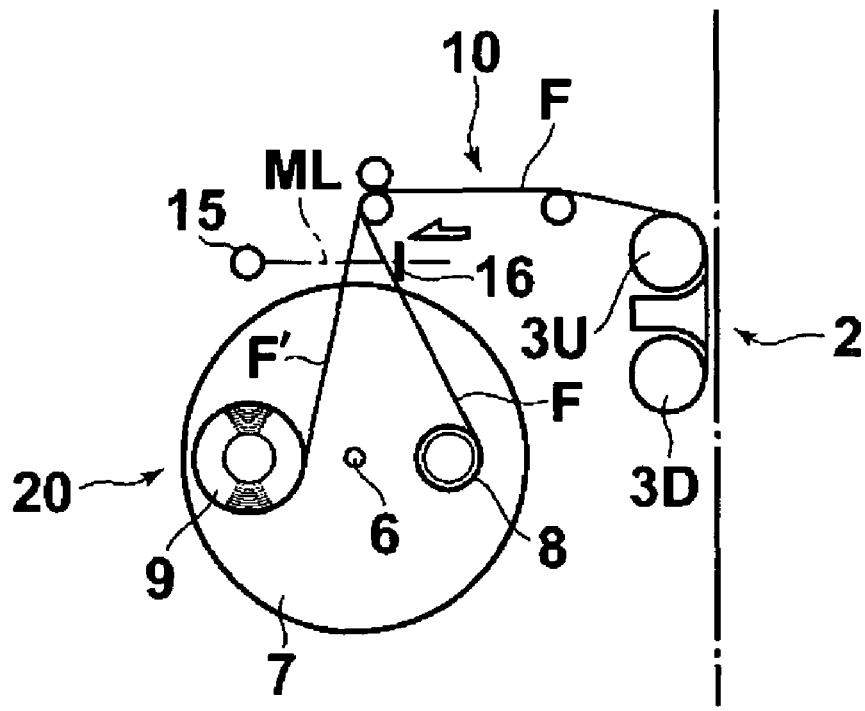
FIG. 3E is a plan view provided for explaining the film roll replacement operation by the film laminating apparatus of FIG. 1.
Figure 3F:
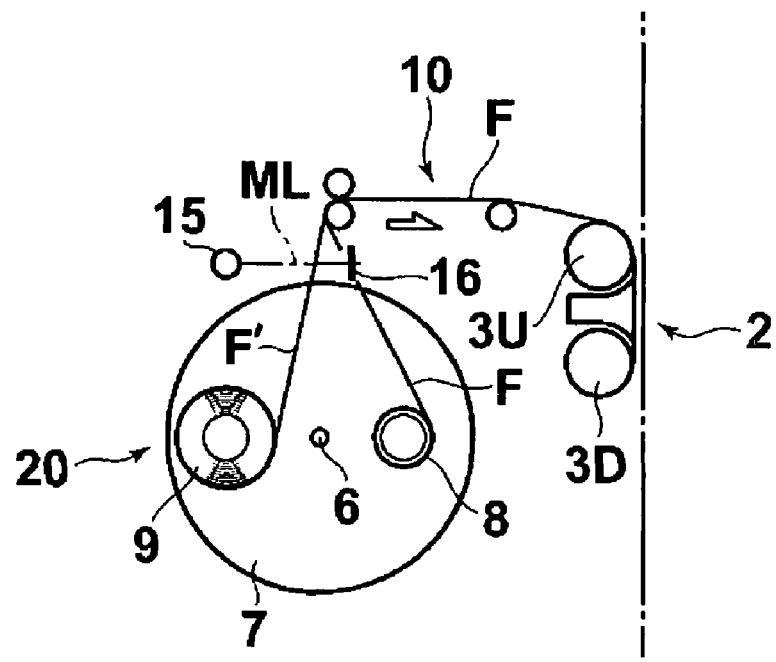
FIG. 3F is a plan view provided for explaining the film roll replacement operation by the film laminating apparatus of FIG. 1.
Figure 3G:
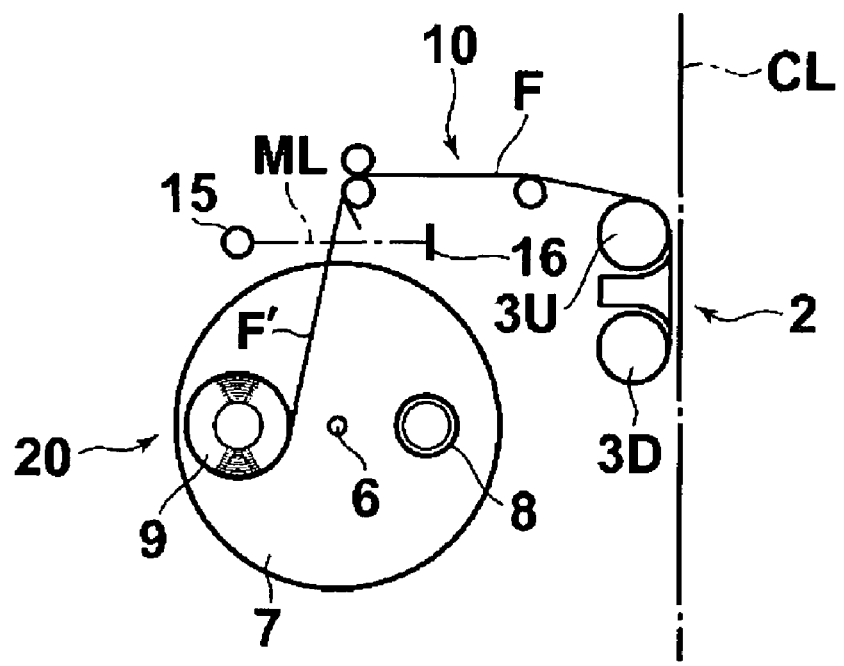
FIG. 3G is a plan view provided for explaining the film roll replacement operation by the film laminating apparatus of FIG. 1.
Figure 3H:
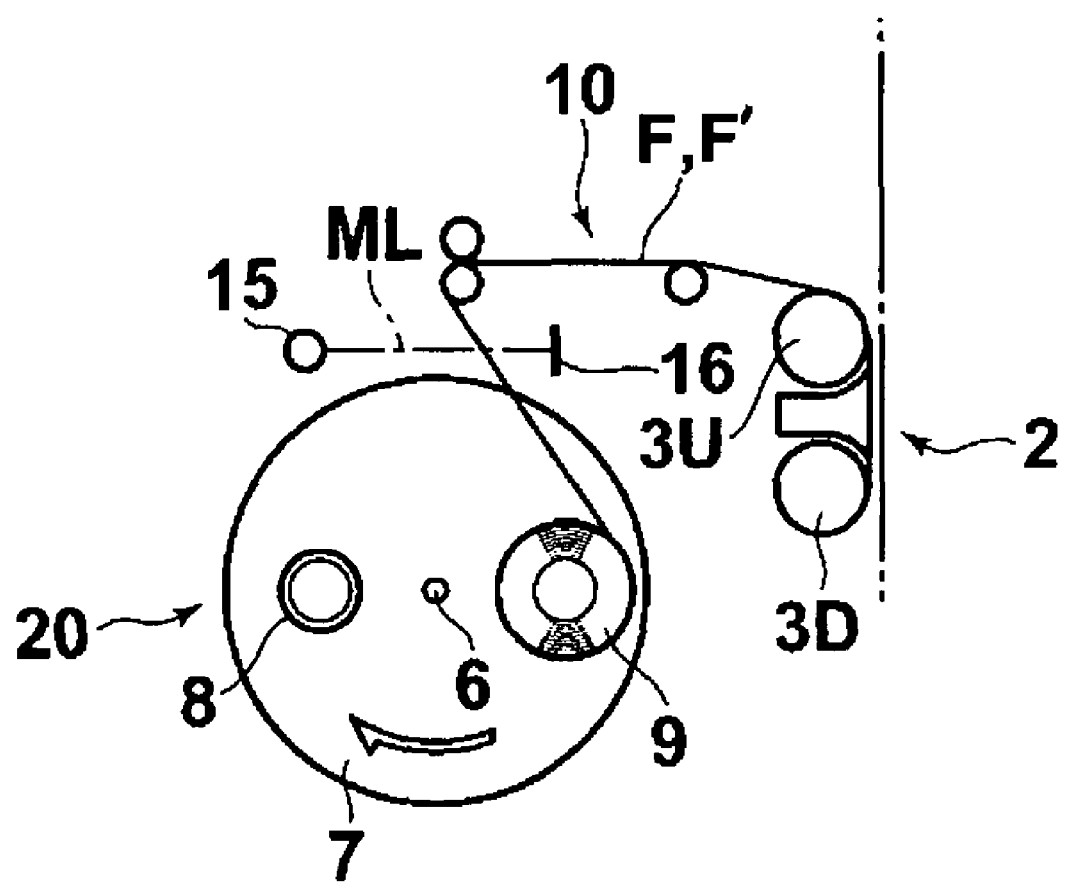
FIG. 3H is a plan view provided for explaining the film roll replacement operation by the film laminating apparatus of FIG. 1.

FIG. 1 is a plan view that schematically illustrates a film laminating apparatus according to an embodiment of the invention.

Referring to FIG. 1, a film laminating apparatus 1 comprises a vertical air-float conveyor (not shown) for horizontally conveying glass sheets G on air cushions parallel with the surfaces of the glass sheet G while supporting the lower end of the glass sheets G with the glass sheets G being held in an upright orientation. The film laminating apparatus 1 is formed symmetrically with respect to a center line CL which is a conveyance path, along which the glass sheet G is conveyed by the conveyor.

In the film laminating apparatus 1, a vertical nip roller unit 2 including a pair of nip rollers 3U (disposed upstream) and 3D (disposed downstream) is provided on each side of the center line CL such that the nip rollers are arranged opposing each other, two on each side of the center line CL. Each pair of the nip rollers 3U and 3D is driven by a servomotor in synchronization with the conveying speed of the glass sheets G. Hence, as viewed in FIG. 1, the nip rollers 3U and 3D disposed on the left side are turned in the clockwise direction, while the nip rollers 3U and 3D disposed on the right side are turned in the counter-clockwise direction about their vertically oriented rotational axes.

Film guide plates 4, each of which supports film lamination by guiding a predetermined length of a film F and reinforces the structure of the nip roller unit 2 (by enhancing the positional accuracy, the orientation accuracy and the like), are disposed, one between each pair of nip rollers 3U and 3D. These nip rollers 3U, 3D and the guide plates 4 are advanced and retracted with respect to the center line CL by an air cylinder (not shown).

A rotary table 7 that can be turned in 180 degree increments about a vertical axis 6 is provided behind each nip roller unit 2. The left-hand rotary table 7 is turned in the clockwise direction while the right-hand rotary table 7 is turned in the counter-clockwise direction. A film feed roll 8 for feeding a film, which can rotate about its own vertical axis, and a refill film roll 9, which can also rotate about its own vertical axis, are positioned diametrically opposed from each other with respect to the vertical axis 6 on each rotary table 7.

Each film feed roll 8 is rotated in synchronization with the nip rollers 3U, 3D by the servo motor. The film feed roll 8 forms a vertical film feed unit 10 in conjunction with rollers 11 and 12 provided partway along a film feeding path from the film feed roll 8 to the nip roller 3U and an escape bar 13. The rollers 11 and 12 rotate respectively about their own vertical axes as well as the film feed roll 8, and the escape bar 13 also extends vertically.

The rollers 11 and 12 are dancer rollers for adjusting the tension of the film F. The escape bar 13 moves up and down as viewed in the drawing and serves to slightly move the film F, which is wound around the nip roller 3U, away from the nip roller 3U to facilitate cutting of the film by a cutter 18 (to be described later).

The leading end of a refill film F' is drawn as a leading film from the refill film roll 9 as well as the film feed roll 8 provided on each rotary table 7, and held at a point P of a film setting bar 15 that extends vertically. The film setting bar 15 has a top end and a bottom end respectively supported by sliding bases (not shown), and is provided to be moved by the air cylinder between a standby position shown in FIG. 1 and a film joining position (to be described later) located to the left and right sides of the stand-by position on the sliding base along a conveyance path indicated by broken line ML. It is desirable that the leading end of the refill film F' is held at the point P, for example, by vacuum suction through a slit or the like formed in the film setting bar 15.

A cutter 16 for cutting the film F is provided on to the side of each film setting bar 15 so as to be movable between the stand-by position shown in FIG. 1 and a film cutting position located on the left and right sides of the stand-by position along the aforementioned conveyance path ML. Each cutter 16 is designed to cut a film by vertically moving on a vertical sliding base. The vertical sliding base is movable on another sliding base similar to the aforementioned sliding base along the aforementioned conveyance path ML.

The rotary tables 7 having the configuration described above, the refill film rolls 9, the film setting bars 15 and the cutters 16 constitute an automatic film roll replacement mechanism 20.

Hereinafter, the film lamination operation by the film laminating apparatus 1 will be described with reference to FIG. 2A through FIG. 2F. For the sake of simplicity and clarity in views in FIG. 2, the portion of the film laminating apparatus 1 to the right of the center line CL in FIG. 1 is omitted, except for the nip roller unit 2.

In the initial position shown in FIG. 1, the leading ends of the films F extending from the film feed rolls 8 respectively reach the upstream nip rollers 3U and 3U of the opened nip roller units 2.

Closing of Upstream Nip Rollers

In the initial state shown in FIG. 1, when the leading end of a glass sheet G penetrates between the upstream nip rollers 3U and 3U, the nip rollers 3U and 3U are respectively pressed against both surfaces of the glass sheet G via films F.

(B) Feeding of Films and Glass Sheet

The nip rollers 3U, 3U, 3D, and 3D are rotated in synchronization with the moving speed of the glass sheet G, and simultaneously the film feed rolls 8 and 8 start rotation in synchronization with the nip rollers 3U, 3U, 3D, and 3D, thereby starting lamination of the films.

(C) Closing of Downstream Nip Rollers

When the leading end of the glass sheet G penetrates between the downstream nip rollers 3D and 3D, the nip rollers 3D and 3D are respectively pressed against both surfaces of the glass sheet G via the films F.

(D) Opening of Upstream Nip Rollers

With the upstream nip rollers 3U and 3U being widely opened and only the downstream nip rollers 3D and 3D being pressed against the glass sheet G, the film feed rolls 8 and 8, and the nip rollers 3U, 3U, 3D, and 3D are rotated in synchronization with each other.

(E) Cutting of Films

When the trailing end of the glass sheet G comes close to the upstream nip rollers 3U and 3U, the degree of opening between the upstream nip rollers 3U and 3U decreases, while the cutters 18, 18 respectively cut the films F at the trailing end of the glass sheet G.

(F) Feeding of Films and Glass sheet

The lamination of the films is completed, by pressing only the downstream nip rollers 3D and 3D against the glass sheet G, and the mechanism returns to the initial state shown in FIG. 1.

Next, the operation of the film roll replacement mechanism 20 when the remaining amount of the film F of the film feed roll 8 approaches zero will be described with reference to FIG. 3A through 3H. For the sake of simplicity and clarity in views in FIG. 3, only the portion of the mechanism on the left side of the center line CL is shown.

Initial Position

The initial position is the same as the state shown in FIG. 1.

(B) Joining of Remaining Film and New Film

The film setting bar 15 is moved to the film joining position on the right side thereof and joins the leading end of the refill film (new film) F' to the remaining film F. The joining methods contemplated for use in this case include: placing an adhesive member (or applying an adhesive agent) to the leading end of the new film F' and pressing the adhesive leading end to the remaining film F; and imparting a heater function to the film setting bar 15 and welding the films to each other by means of relatively low heat.

(C) Feeding of Film

The remaining film F and the new film F' are fed towards the nip roller 3U in a state in which the films are overlapped on each another.

(D) Returning of Film Setting Bar

The film setting bar 15 is returned to its stand-by position.

(E) Movement of Cutter to Film Cutting Position

The cutter 16 is moved to the film cutting position on the left side thereof.

(F) Cutting of Film

The remaining film F is cut by the cutter 16.

(G) Returning of Cutter

The cutter 16 is returned to its stand-by position.

(H) Replacement of Film Roll

After the rotary table 7 is turned 180 degrees, whereby the refill film roll 9 is moved to a film feeding position and the film roll replacement is thus completed, a certain amount of the film including the superimposed region is subjected to preliminary feeding by the use of a timer, discharged out of the nip roller unit 2, and cut off. A new refill film roll is set at the film roll refill position, the leading end of the new refill film is set to the film setting bar 15, and the mechanism goes into the initial state.

As is apparent from the above description, according to the present embodiment of the invention, the film laminating apparatus is provided with the vertical nip roller unit 2 that comprises the plurality of nip rollers 3U, 3U, 3D, and 3D, wherein the nip rollers are pressed, via the films respectively fed from the film feeding units 10, against both surfaces of the horizontally moving glass sheet G, which is conveyed and is held in the upright orientation by the conveyor. Therefore, the lamination apparatus can be directly introduced into the manufacturing line of the glass sheets G and the films F can be laminated on both surfaces of the glass sheets G in succession. As a result, the manufacturing plant can accommodate increases in glass production quantity per unit time without delay.

Further, by the fact that the nip roller unit 2 itself can perform the film lamination operation with the center position thereof being secured and the nip roller unit being provided in an upright manner such that the rotational axes of the respective nip rollers 3U, 3U, 3D, 3D provided therein are oriented vertically, the construction of the nip roller unit 2 can be simplified and made lighter, and the space occupied by the apparatus can be significantly reduced.

Further, the nip rollers 3U and 3D and the film feed roll 8 of each nip roller unit 2 are rotated in synchronization with each other, whereby the possibility of wrinkles or the like occurring in the film F laminated on the surface of the glass sheet G is precluded.

Still further, by the fact that the film laminating apparatus 1 of the invention has the automatic film roll replacement mechanism 20, replacement of the film rolls 8, 9 can be performed in a very short time and the requirement regarding the cycle time in association with increase in glass production quantity can be satisfied without loss of glass.

What is claimed is:

1. A film laminating apparatus configured to horizontally laminate protective films on both surfaces of vertically oriented glass sheets simultaneously while the vertically oriented glass sheets are horizontally conveyed along a horizontal conveyance path, the film laminating apparatus comprising:

a conveyor configured to horizontally convey the vertically oriented glass sheets along the horizontal conveyance path while holding the glass sheets in a vertical upright orientation;

film feed units horizontally disposed on each side of the horizontal conveyance path through which the vertically oriented glass sheets are horizontally conveyed by the conveyor; and vertical nip roller units disposed on each side of the horizontal conveyance path, each vertical nip roller unit comprising a plurality of nip rollers, wherein each nip roller has a vertically oriented rotational axis, and the vertical nip roller units are configured to be positioned such that at least one nip roller from each vertical nip roller unit is pressed together along the corresponding vertically oriented rotational axis wherein films from the film feed units are simultaneously pressed against both surfaces of the glass sheets to sandwich the glass sheets between the films as the vertically oriented glass sheets are horizontally conveyed by the conveyor along the horizontal conveyance path.

2. A film laminating apparatus as defined in claim 1, wherein the plurality of nip rollers of the vertical nip roller units can be advanced and retracted with respect to the surfaces of the glass sheets.

3. A film laminating apparatus as defined in claim 1, wherein each of the film feed units is provided in an upright manner such that the rotational axis of a film feed roll, for feeding the film wound around the film feed roll, and the rotational axes of a plurality of rollers, which are provided partway along a film feeding path from the film feed roll to the nip rollers, are oriented vertically.

4. A film laminating apparatus as defined in claim 2, wherein each of the film feed units is provided in an upright manner such that the rotational axis of a film feed roll, for feeding the film wound around the film feed roll, and the rotational axes of a plurality of rollers, which are provided partway along a film feeding path from the film feed roll to the nip rollers, are oriented vertically.

5. A film laminating apparatus as defined in claim 3, wherein the nip rollers and the film feed roll of each film feed unit are rotated in synchronization with each other.

6. A film laminating apparatus as defined in claim 3, wherein the film feed roll is provided on a rotary table at a position apart from a vertical axis around which the rotary table turns, and a refill film roll is provided on the rotary table at a position symmetric with the film feed roll with respect to the vertical axis of the rotary table.

7. A film laminating apparatus as defined in claim 4, wherein the nip rollers and the film feed roll of each film feed unit are rotated in synchronization with each other.

8. A film laminating apparatus as defined in claim 4, wherein the film feed roll is provided on a rotary table at a position apart from a vertical axis around which the rotary table turns, and a refill film roll is provided on the rotary table at a position symmetric with the film feed roll with respect to the vertical axis of the rotary table.

9. A film laminating apparatus as defined in claim 5, wherein the film feed roll is provided on a rotary table at a position apart from a vertical axis around which the rotary table turns, and a refill film roll is provided on the rotary table at a position symmetric with the film feed roll with respect to the vertical axis of the rotary table.

10. A film laminating apparatus as defined in claim 6, wherein the film feed roll is provided on a rotary table at a position apart from a vertical axis around which the rotary table turns, and a refill film roll is provided on the rotary table at a position symmetric with the film feed roll with respect to the vertical axis of the rotary table.

11. A film laminating apparatus as defined in claim 7, further comprising a film setting bar for holding a leading end of a leading film drawn from the refill film roll, wherein the film setting bar is provided so as to be movable between a standby position and a film joining position, and when the film roll is to be replaced, the film setting bar is moved from the stand-by position to the film joining position and serves to join the leading end of a refill film to the film drawn from the film feed roll.

12. A film laminating apparatus as defined in claim 11, further comprising a cutter for cutting the film drawn from the film feed roll after the leading end of the refill film is joined to the film drawn from the film feed roll and the film setting bar is returned to its stand-by position.

13. A film laminating apparatus as defined in claim 8, further comprising a film setting bar for holding a leading end of a leading film drawn from the refill film roll, wherein the film setting bar is provided so as to be movable between a standby position and a film joining position, and when the film roll is to be replaced, the film setting bar is moved from the stand-by position to the film joining position and serves to join the leading end of a refill film to the film drawn from the film feed roll.

14. A film laminating apparatus as defined in claim 13, further comprising a cutter for cutting the film drawn from the film feed roll after the leading end of the refill film is joined to the film drawn from the film feed roll and the film setting bar is returned to its stand-by position.

15. A film laminating apparatus as defined in claim 12, wherein the rotary table is capable of being turned to move the refill film roll to a film feeding position after the film drawn from the film feed roll is cut by the cutter.

16. A film laminating apparatus as defined in claim 14, wherein the rotary table is capable of being turned to move the refill film roll to a film feeding position after the film drawn from the film feed roll is cut by the cutter.

* * * * *